United States Patent
Braun et al.

[15] 3,693,178
[45] Sept. 19, 1972

[54] COLORSCANNER

[72] Inventors: Ernest J. Braun, Downey; Ralph M. Adams, San Gabriel, both of Calif.

[73] Assignee: White Memorial Medical Center, Los Angeles, Calif.

[22] Filed: April 29, 1970

[21] Appl. No.: 32,854

[52] U.S. Cl..............346/1, 250/71.5 S, 346/33 ME, 346/110 R
[51] Int. Cl............................G01d 9/42, A61b 6/00
[58] Field of Search......346/110, 33 R, 33 F, 33 ME; 250/71.5 S; 178/5.2 D, 5.4 CD, 5.4 CF, 6.7 R

[56] References Cited

UNITED STATES PATENTS 3,151,927  10/1964  Angst et al...................346/25
3,303,508  2/1967  Jaffe et al. ............346/33 ME
3,483,565  12/1969  Jaffe et al. ............346/33 ME

*Primary Examiner*—Joseph W. Hartary
*Attorney*—Flam and Flam

[57] ABSTRACT

In order to produce a colorscan of an internal organ or the like, isocount sections are successively displayed on an oscilloscope screen. The oscilloscope screen is photographed through color and neutral density filters. A computer determines the progression of isocount sections, the color and neutral density filters operative as each isocount display is photographed as well as the times of exposure thereof. Any combination of hue, saturation and brilliance can be provided as a color code for each isocount.

12 Claims, 6 Drawing Figures

70%-80%

80%-90%

90%-100%

INVENTORS.
ERNEST J. BRAUN
RALPH M. ADAMS
By Flam and Flam
ATTORNEYS.

INVENTOR.
ERNEST J. BRAUN
RALPH M. ADAMS

COLORSCANNER

BACKGROUND OF THE INVENTION

1. Field of Invention

This invention relates to apparatus for producing charts in color showing the distribution of radioactive isotopes in organs or other parts of a living animal. Apparatus of this general type is shown and described in U.S. Pat. Nos. 3,303,508 and 3,483,565 issued to Ralph M. Adams (one of the present co-inventors) and Henry L. Jaffe. By the aid of such apparatus, shades of radioactivity are vividly displayed so that diagnosis is not only facilitated, but made more certain.

2. Discussion of Prior Art

Colorscanning equipment of the type shown and described in said Jaffe-Adams patents provides a set progression of colors for successive levels of radioactivity. What the successive colors should be in terms of hue, saturation and brilliance is, in practice, psychologically subjective. A certain set of colors totally acceptable to one radiologist may be totally unacceptable to another. Selecting and changing filters to satisfy various users of the equipment is a matter of no small concern. Accordingly, one of the objects of this invention is to provide total and complete versatility of color and sequences of color without requiring any physical changes of filters whatsoever.

Another object of this invention is to provide color-scanning apparatus of this character that is especially suitable for use in conjunction with digital data storage apparatus of the type now used to produce "isocount" displays. Such isocount displays are similar to individual topographical sections showing the location of those portions of the area characterized by a "level" between certain lower and upper limits. A composite of individually color coded topographical sections depicts the contour In a radiological scan, the isocount, instead of being "level" measured in terms of altitude, is "level" measured in terms of radioactivity. The present invention provides simple means for producing readable color composites of such isocount sections. The isocount sections can be produced either by logical processing of raw data received from transversing transverse scanners, or by more simpler logical processing of raw data received from non-traversing type scanners.

BRIEF SUMMARY OF THE INVENTION

In order to accomplish the foregoing objects, we provide a system in which isocount sections are successively color photographed. For each isocount section to be photographed, machine instructions position one or more color or neutral density filters and determine the exposure time. These machine instructions may be changed by computer input techniques so that any combination of hue, saturation and brilliance can be provided as a color code for any isocount level. We provide a simple control mechanism interposed between a small memory computer and filter drive motor and shutter control.

BRIEF DESCRIPTION OF THE DRAWINGS

A detailed description of the invention will be made with reference to the accompanying drawings. These drawings, unless described as diagrammatic or unless otherwise indicated, are to scale.

DETAILED DESCRIPTION

The following detailed description is of the best presently contemplated mode of carrying out the invention. This description is not to be taken in a limiting sense, but is made merely for the purpose of illustrating the general principles of the invention since the scope of the invention is best defined by the appended claims.

GENERAL DESCRIPTION

Figure 1:
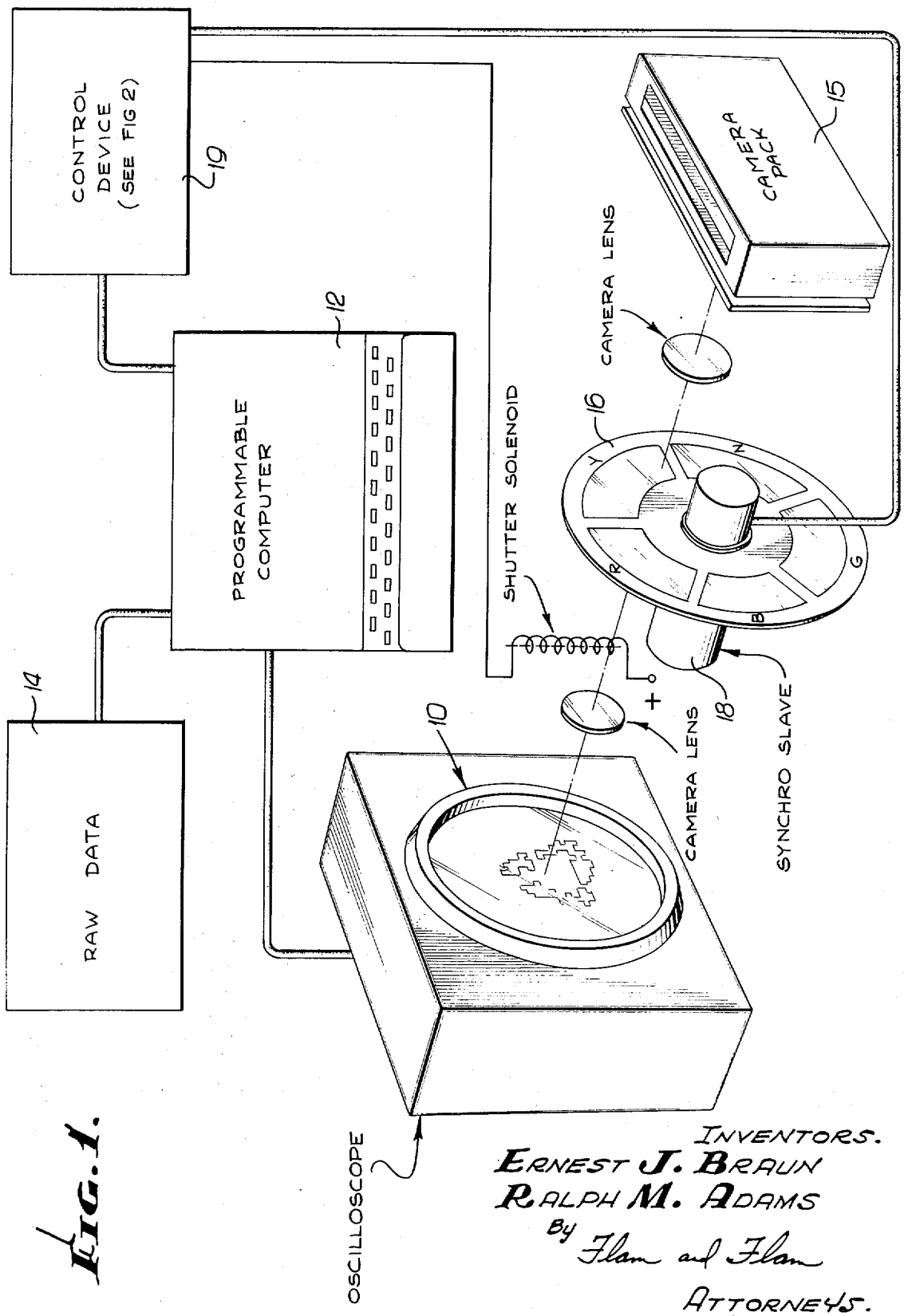
FIG. 1 is a block diagram of the components of the color-scanning system.

In FIG. 1 there is shown an oscilloscope 10 that displays, under control of a small programmable computer 12, isocount sections corresponding to a certain range in the level of radioactivity of an organ or body part under study.

A suitable input device 14 feeds information into the computer 12, which may comprise a Digital Equipment Corporation Model PDP 81 general purpose digital computer. The device 14 may be a suitable radiation detection device or a tape record produced by such device. A scintillation camera of the type manufacture by Nuclear-Chicago is especially suitable. This scintillation camera includes a large area non-traversing head. When a nuclear particle impinges on the crystal, three electrical signals are generated: an $x$ coordinate signal, a $y$ coordinate signal, and a control pulse. Ordinarily these signals are applied to an oscilloscope that is photographed, the $x$ and $y$ signals being applied to the deflection plates and the control pulse being used to gate the oscilloscope beam. Instead of sending the signals directly to an oscilloscope, they are used to build a picture stored in a computer. The computer memory, for digital purposes, considers the image field as made up of 4,096 elemental squares — 64 rows of 64 squares each. A count can be stored at each address. Whenever a pulse is generated by the camera, the computer guided by the $x$ and $y$ signals adds a count to the corresponding computer address. The whole process of incrementing the count takes place until a total number of counts are processed. A simple counter mechanism controls the input and signals readiness for processing.

On machine command, which may be in accordance with a program such as described hereinafter, the computer by manipulation of the stored data causes the oscilloscope 10 to display in corresponding $x$—$y$ array, those elements or squares where the radiation level falls between certain percentage limits of the maximum. Thus, an "isocount" display is provided.

In order to record a composite scan of the isocounts in various colors, a camera is provided, parts of which are diagrammatically depicted in FIG. 1. One of the parts is a film pack 15 such as manufactured and sold by the Polaroid Corporation. The camera records in sequence and in a color coded manner, all of the isocount displays produced on the oscilloscope screen. The code is provided by a filter wheel 16 having, in this instance, five color segments corresponding to red, yellow, blue, green and neutral. The wheel 16 is positioned by a synchro slave motor 18 that forms an extension of a control device 19.

In FIG. 1 the oscilloscope is displaying, by way of example, an isocount section between radiation levels of 70–80 percent of the maximum. The shutter of the camera is open and the yellow section of the filter wheel 16 is operatively positioned. The camera thus photographs the 70–80 percent isocount display in yellow. After this isocount display is photographed, exposure is prevented either by closing the shutter or by turning off the oscilloscope beam. Control of the beam is preferred. When the beam is off, the motor 18 shifts the filter wheel 16. The beam is then turned on; the oscilloscope 10 displays the next isocount, say, the 60–70 percent isocount; and this isocount display is photographed with its corresponding color code.

For any one isocount section to be displayed by the oscilloscope, two or more filter sections can be positioned for any desired times. Thus, the color code can be controlled as to hue, saturation and brilliance. Brilliance is controlled by the total time of exposure; hue is controlled by selecting combinations of the four color filters; and saturation is controlled by use of the neutral density filter section.

MACHINE COMMAND LIST

The computer 12 produces instructions in appropriate machine language translated, by way of example, as follows:

START — Open Shutter
1A. Generate deflection pattern to display 90–100 percent iscount.
1B. Position red filter.
1C. Turn on oscilloscope beam upon verification of filter wheel position.
1D. Turn off beam after 0.5 second time delay.
2A. Generate deflection pattern to display 80–90 percent isocount.
2B. Position red filter.
2C. Turn on oscilloscope beam on verification of filter wheel position.
2D. Turn off beam after 0.2 second time delay.
2E. Move shutter to yellow.
2F. Turn on oscilloscope beam upon verification of filter wheel position.
2G. Turn off beam after 0.2 second time delay.
2H. Move filter wheel to neutral density position.
2I. Turn on beam upon verification of filter wheel position.
2J. Turn off beam after 0.1 second time delay.
3A. Generate deflection pattern to display 70–80 percent isocount.
3B. Position yellow filter.
3C. Turn on beam upon verification of filter wheel position.
3D. Turn off beam after 0.3 second time delay.
4A. etc.
STOP — Close Shutter

ANGULAR MOVEMENT OF FILTER WHEEL

Figure 2:
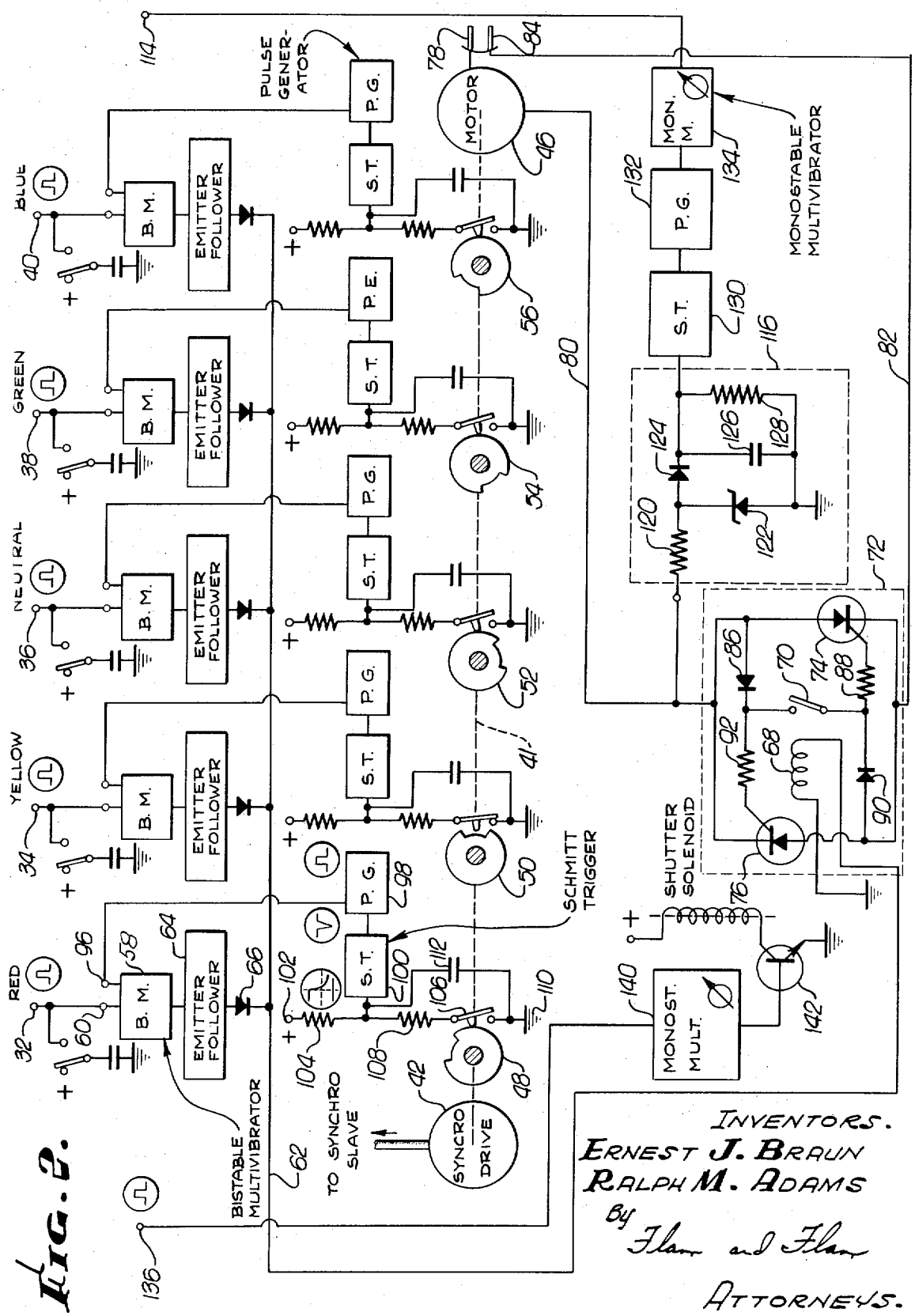
FIG. 2 is a circuit diagram of the control device shown in FIG. 1, some of the more conventional circuit elements being shown in block diagram.
Figure 5:
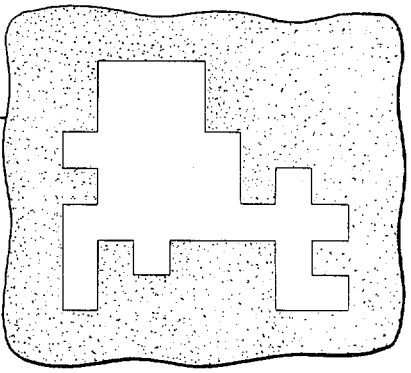

After the 90–100 percent isocount (FIG. 5) is generated (step 1A) the computer 12 (step 1B) sends a pulse to a terminal 32 located in the control device 19 (FIG. 2). A pulse at terminal 32 results in the red filter being positioned. (Pulses at terminals 34, 36, 38 and 40 cause the yellow, neutral, green and blue filters to be positioned in a similar manner). A pulse at the "red" terminal 32 initiates movement of a cam shaft 41. A synchro drive 42 connected to the shaft 41 causes the remote synchro slave 18 to follow the shaft position. A small motor 46 drives the cam shaft 41.

The shaft 41 carries a series of five switch control cams 48, 50, 52, 54 and 56, respectively associated with the red, yellow, neutral green and neutral, filter control circuits.

A pulse at "red" terminal 32 operates a double input bistable multivibrator 58 in the "red" control circuit. The multivibrator 58 is of the type shown in said Jaffe-Adams U.S. Pat. No. 3,483,565. This device has two isolated inputs and produces alternate outputs only in response to signals at alternate inputs. A signal at one of its input terminals 60 causes the bistable multivibrator to produce an "ON" signal. The "ON" signal is power applied to a common control lead 62 through an associated emitter follower stage 64 and an isolation diode 66. The "ON" signal, through the control lead 62, operates a solenoid 68 to close a normally open switch 70 in a conventional SCR power switching circuit 72. A single emitter follower circuit could be provided instead of one for each control circuit. In this case, the isolation diodes would form parallel input circuits to the common emitter follower, and the output of the emitter follower would be connected to the lead 62. In place of the multivibrator 58, a conventional cross connected pair of NOR gates with "set" and "clear" inputs could be provided.

As a result of the closure of the switch 70, controlled rectifiers 74 and 76 complete the motor circuit. The motor circuit can be traced from one plug connector prong 78, motor 46, lead 80, switching circuit 72, lead 82 to the other plug connector prong 84. At the start of the half cycle in which the lead 80 is positive, the controlled rectifier 74 will be turned on by the application of the signal from the lead 80, diode 86, switch 70, resistor 88 to the gate of the controlled rectifier 74. At the start of the other half cycle, the other controlled rectifier 74 will be turned on by the aid of a signal through a diode 90, switch 70 and a resistor 92. The motor 46, accordingly, begins to turn.

STOPPING FILTER WHEEL IN POSITION

When the red filter section is in position, a switch 106 in the "red" control circuit closes under the control of the cam 48. This causes a signal to be applied to the other input 96 of the bistable multivibrator 58, resulting in an "OFF" signal in which power is removed from line 62. The switch 70 then opens and the motor 46 and cam shaft 41 stop.

The alternate input 96 is provided with a pulse of appropriate shape and characteristics by a pulse generator circuit 98. The pulse generator operates in response to a signal produced by a Schmidt trigger circuit 100. The trigger 100 produces an output for the pulse generator 98 only when its input level drops below a critical value. The input to the Schmidt trigger is high when the shaft 41 is off the "red" station. For this purpose, the input to the trigger circuit 100 is connected to a supply terminal 102 through a feeder resistor 104.

When the shaft 41 arrives at the "red" position, the input to the Schmidt trigger circuit drops below the trigger level. When the shaft 41 is at the "red" position, the cam 48 allows a switch 106 to close. A resistor 108 then connects the trigger input to a ground terminal 110. Resistors 104 and 108 form a divider with their junction connected to the trigger input. By proper selection of values, the potential at the junction point is less than the critical value. A capacitor 112 placed across the series combination of the resistor 108 and the switch 106 softens the shock of an otherwise abrupt voltage change.

STATION VERIFICATION

The circuit shown in the lower righthand corner of FIG. 2 generates a signal pulse when the motor shuts down. This verification signal is sent back to the computer through terminal 114. A small DC power supply 116 senses the existence of power to the motor 46. Thus, the supply has an input terminal 118 connected to the lead 80. The power supply includes a series resistor 120, a regulating Zener diode 122, a rectifying diode 124, a regulating condenser 126, and a load resistor 128. When the motor is on, a DC signal is applied through the diode 124 to the input of a Schmidt trigger circuit 130. When the motor shuts off, the power supply voltage decays. The Schmidt trigger then produces an output pulse that actuates a pulse generator 132. The pulse generator in turn actuates an adjustable pulse width monostable multivibrator 134 whereby a suitable pulse is returned to the computer.

OSCILLOSCOPE BEAM OPERATION

In response to the verification signal, the computer turns on the oscilloscope beam for a predetermined period (steps 1C and 1D).

CAMERA EXPOSURE TO SUCCESSIVE ISOCOUNTS

Figure 3:
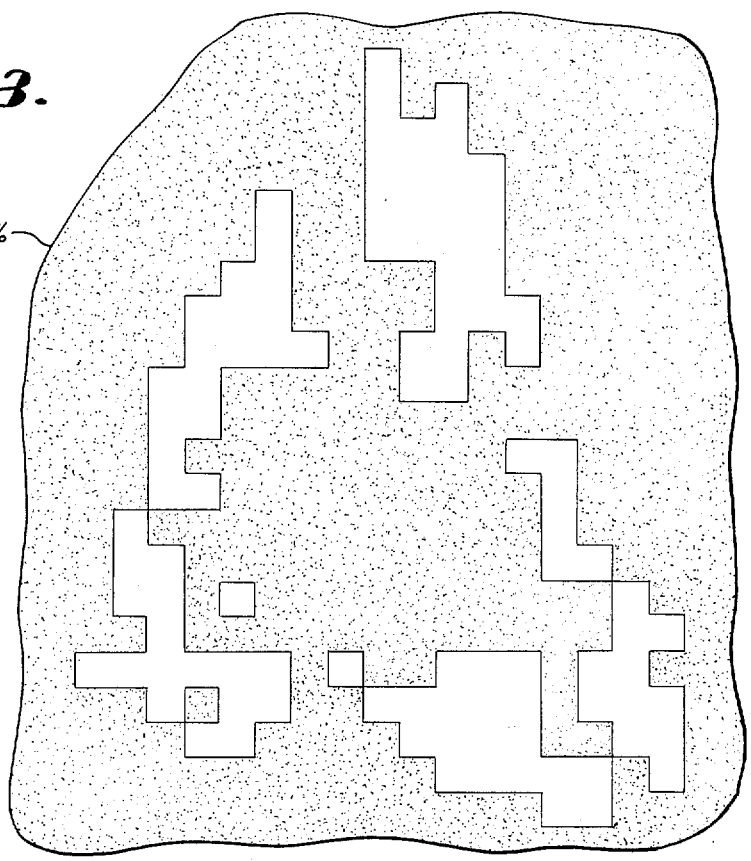
FIGS. 3, 4 and 5 are isocount sections corresponding to displays successively produced on the oscilloscope screen shown in FIG. 1.
Figure 4:
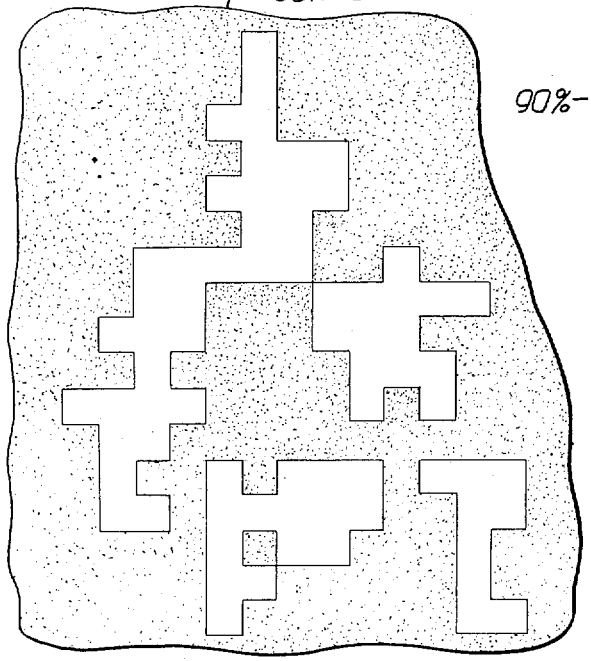
Figure 6:
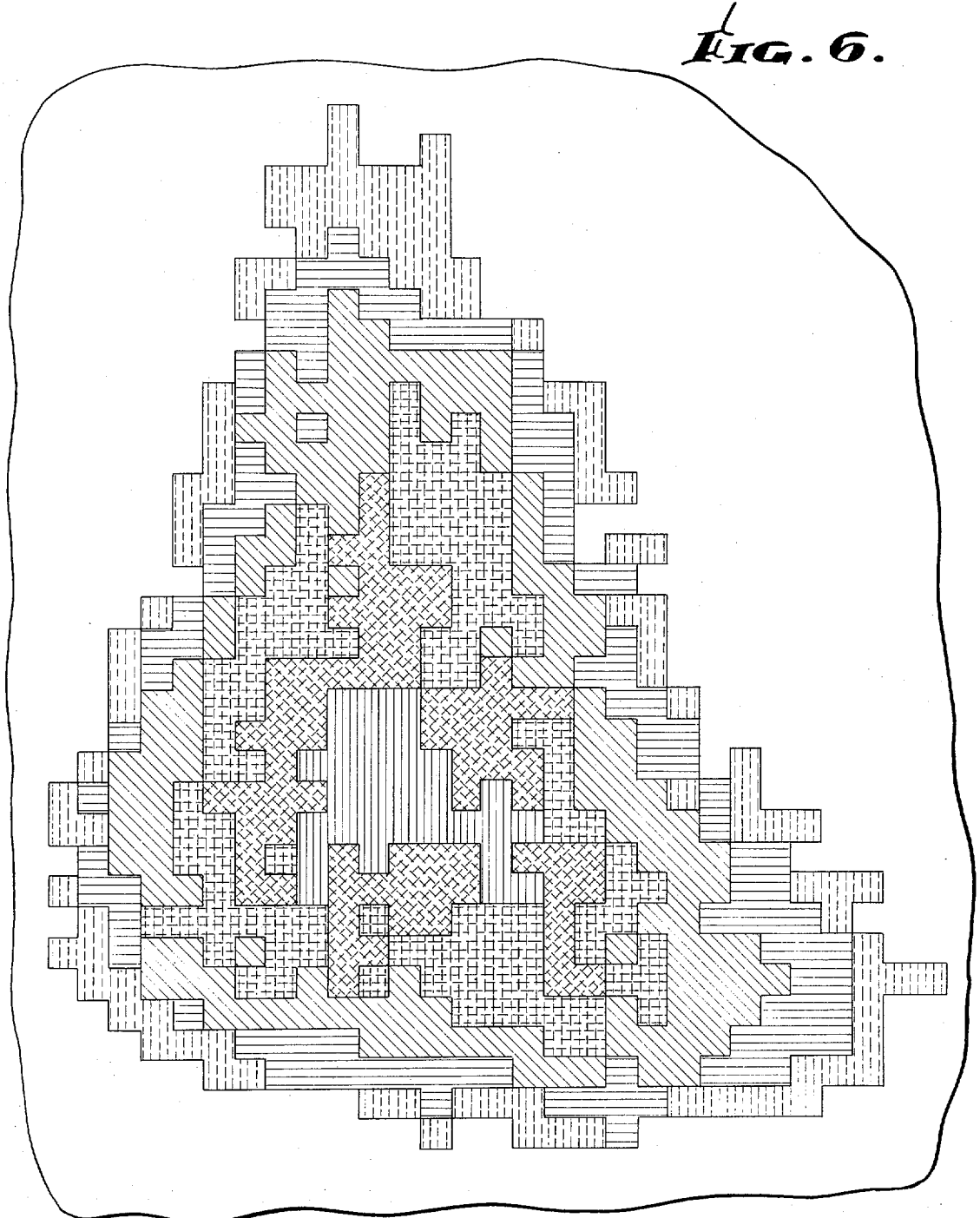
FIG. 6 is a composite colorscan and corresponding to a photograph taken by the camera depicted in FIG. 1.

At step 2A, the computer changes the deflection pattern to be produced at the oscilloscope tube to correspond to that shown in FIG. 4. At steps 2B through 2I, the filter disc and shutter are operated as previously described, except that a combination of filters are used to create a different color, in this instance orange. Thus, in suitable sequence, computer pulses are applied to the "red", then "yellow", and finally the "-neutral" terminal 36. The computer continues through its routine to display the third 70–80 percent isocount (FIG. 3) and to photograph it in a different color. After the entire routine is performed, the shutter is closed and a colorscan corresponding to FIG. 6 is produced.

SHUTTER OPERATION

For controlling the shutter, the computer sends a "-START" pulse to a terminal 136. This pulse actuates an adjustable pulse width monostable multivibrator 140 that provides base current for a switching transistor 142 which is on for a controlled interval. The transistor 142 momentarily closes a power circuit for the shutter solenoid 20, and the shutter opens. A subsequent "STOP" pulse is applied to the terminal 136 when the routine is completed.

HUE, SATURATION AND BRILLIANCE

The hue, saturation and brilliance to provide any desired color code for any isocount are determined by a combination of filter positions and exposure time. The program steps 1, 2, 3, etc. heretofore described can readily be changed by manual input or by recalling instruction sets stored in the computer. The particular color codes desired by the radiologist can thus be provided by simple techniques not involving any change in the filter structures themselves. The choice of color codes is unlimited.

Intending to claim all novel, useful and unobvious features shown or described, we make the following claims:

1. The process of producing a colorscan which comprises:
   a. sequentially displaying on a screen, a series of individual isocounts corresponding to certain ranges in levels of radioactivity;
   b. locating a camera in position to photograph said screen;
   c. interposing between said camera and said screen a color code means having sections of different characteristic color as well as a section of neutral color;
   d. operatively positioning the sections and operatively controlling camera exposure in accordance with a program coordinated with the displaying of said isocounts to provide a color code for each isocount fixed in accordance with the three variables of hue, saturation and brilliance.

2. The process as set forth in claim 1 wherein said step (a) comprises:
   storing in a computer memory array counts specifying nuclear radiation levels detected at positional coordinates corresponding to locations of storage cells in said array, and
   illuminating the elemental areas of said screen corresponding in location to memory storage cells containing counts within a selected range, thereby producing an isocount corresponding to a certain range of radioactivity levels.

3. In apparatus for producing a colorscan:
   a. a device having the characteristics of an oscilloscope screen for displaying spots of illumination;
   b. a camera having means for holding color film and positioned to photograph said screen;
   c. a movable code member having a plurality of sections may one of which may be operatively positioned between said screen and said film, each section having a different color characteristic, and at least one of said sections being of neutral characteristic; and
   d. programmed means for displaying on said screen, isocounts of an area distributed function, for controlling the exposure of the camera and for positioning various sections of said code member of predetermined times whereby a color coded composite is produced controlled as to hue, saturation and brilliance.

4. In apparatus for producing a colorscan:
   a. a device having an electronically controlled display area;

b. means for sequentially producing on said display area, a series of individual isocounts corresponding to certain ranges in levels of radioactivity;

c. a camera having means for holding a color photosensitive sheet and positioned to photograph said display area;

d. color code means interposed between said sheet holding means and said display, said means having sections of different characteristic color as well as a section of neutral color;

e. means for shifting the color code means relative to the camera and the display area for operatively positioning any one of said sections; and f. programmed computer means for controlling said means for shifting and for establishing the time of exposure through each operatively positioned color section during the display of each isocount, whereby a colorscan is provided the color code of which is controlled as to hue, saturation and brilliance without physical alteration of said color code means.

5. The apparatus as set forth in claim 1 in which said isocount producing means is selected from the group consisting of a non-traversing scintillation camera divided digitally into an array of elemental areas and a machine record of the output of such scintillation camera.

6. The apparatus as set forth in claim 1 in which said color code means is a color wheel in which said sections are filters angularly spaced about the wheel.

7. The apparatus as set forth in claim 1 further comprising: a shaft coupled to said shifting means; a motor for operating said shaft; a plurality of parallel control circuits for said motor, each control circuit including a logic gate and each corresponding to one of the sections of said color coded means; each gate being operative to complete an energization circuit for said motor upon reception of a logic signal from said computer means; and means responsive to arrival of the shaft at corresponding section position for resetting the corresponding gate and interrupting the energization of said motor.

8. The apparatus as set forth in claim 7 together with solenoid means for operating the shutter of said camera in response to reception of a logic signal from said computer means.

9. The apparatus as set forth in claim 1 in which said means for sequentially producing comprises:

a computer memory having an array of storage addresses corresponding to like coordinate locations of said display area, radiation detection means for providing control pulses and coordinate signals in response to detected nuclear radiation, said control pulses being stored by said computer memory at the storage addresses identified by said coordinate signals, and means for reading out said computer memory and for illuminating the coordinate locations of said display area corresponding to storage addresses containing counts within a selected range.

10. In apparatus for producing a colorscan:

a. an oscilloscope having a screen;

b. a camera having means for holding a color photosensitive sheet and positioned to photograph said oscilloscope screen;

c. a color code disc interposed between said holding means and said screen, and having a plurality of sections of different color characteristics as well as a section of neutral density;

d. a shaft;

e. means coupling said shaft to said disc;

f. a motor for operating the shaft and having a non-coast characteristic;

g. a plurality of parallel control circuits for the motor, each control circuit including a bistable logic gate having two inputs for respectively determining alternate logic gate output;

h. means operable upon logic gate output resulting from one input for completing an energization circuit for said motor, and means operable upon logic gate output resulting from the other input for interrupting the energization circuit so established;

i. means responsive to movement of the sections into operative position for applying a signal to the said other input of the logic gate of the corresponding control circuit;

j. radiation detection means for providing signals indicative of nuclear radiation levels detected at identified locations of a detection field, and k. a computer responsive to the signals provided by said detection means for controlling said oscilloscope to display selected isocounts on said screen, said computer containing means programmed to expose color film of said camera for predetermined time periods and at predetermined time sequences during display of said isocounts, and to position said sections by application of pulses to the one input circuits of said control circuits whereby a colorscan is produced in which the color code is determined as to all of the variables of hue, saturation and brilliance.

11. The combination as set forth in claim 10 in which said responsive means for each logic gate includes a trigger circuit having a normal input, a switch controlled by the position of said shaft for shifting the input to said trigger circuit, and a pulse generator interposed between the output of said trigger circuit and said other input of said logic gate of said control circuit.

12. The combination as set forth in claim 10 together with means for changing the program of said programmed means to change the color code of said isocounts.

* * * * *